Sept. 29, 1964 A. FRANCK ETAL 3,151,317
MAGNETIC STEPPING CIRCUIT
Filed Oct. 10, 1960

INVENTORS
ABRAHAM FRANCK
DAVID E. KEEFER
BY Cushman, Darby & Cushman
ATTORNEYS

United States Patent Office 3,151,317
Patented Sept. 29, 1964

3,151,317
MAGNETIC STEPPING CIRCUIT

Abraham Franck, Minneapolis, Minn., and David E. Keefer, Houston, Tex., assignors to Sperry Rand Corporation, New York, N.Y., a corporation of Delaware Filed Oct. 10, 1960, Ser. No. 61,433
8 Claims. (Cl. 340—174)

This invention relates to a stepping circuit of the type involving a plurality of stages storing a binary word with the contents of each stage being stepped to the next adjacent stage on the occurrence of a stepping signal input.

In one embodiment, each stage of the stepping circuit includes a single bistable magnetic core of the "thin" ferromagnetic film type. The films have commonly coupled thereto an input line for receiving the stepping signal which when it occurs changes all of the films to a given bistable state. Each film additionally has an output line and a second input line. Between each output line and the next one of the second input lines is a different delay element preferably embodied as the inherent delay of a single stage transistor amplifier. Whenever any film changes to its given state, a signal is provided via its output line and associated delay amplifier to the second input line of the next film causing that next film to change to its other state. In this manner, the stepping circuit may be operated as a ring type counting circuit.

It will be appreciated that due to the high speed characteristics of thin magnetic films, counting can be accomplished by the circuitry at substantially higher rates than heretofore possible. In addition, since at most only one transistor is required per amplifier, a shorter delay time between propagation of the information in one film to the next is reqiured.

It is therefore an object of this invention to provide an improved stepping circuit employing a single bistable magnetic core per stage with the stages being intercoupled by a delay element for propagating purposes.

Another object of the invention in conjunction with the preceding object is the provision of such a stepping circuit with ferromagnetic films as the bistable cores and with the delay elements being the inherent delay of a single stage transistor amplifier.

Still other objects of this invention will become apparent to those of ordinary skill in the art by reference to the following detailed description of the exemplary embodiments of the apparatus and the appended claims. The various features of the exemplary embodiments according to the invention may be best understood with reference to the accompanying drawings, wherein:

Figure 1:
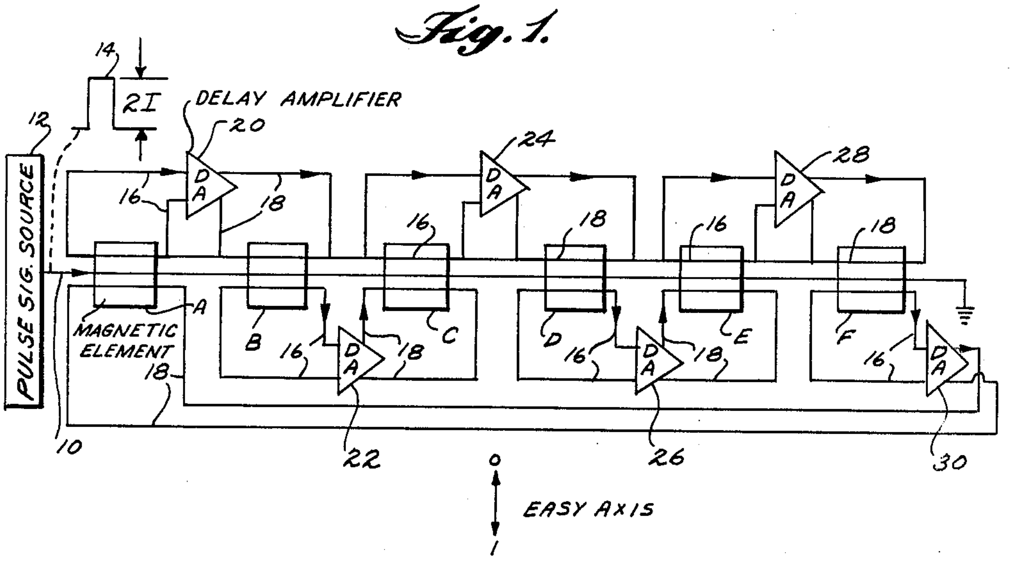
FIGURE 1 is an illustration of an embodiment of the stepping circuit.

FIGURE 1 illustrates the invention as a six stage ring counter, with each stage having a single bistable magnetic core. The respective cores are designated A, B, C, D, E, F, and each is preferably of the thin ferromagnetic film type such as described in Patent No. 2,900,282. Though shown square, each film may actually be circular or have any other desired configuration. Preferably, each of the films has uniaxial anisotropy with the single easy axis of each being oriented vertically in the illustration as shown by legend. Arbitrarily, when the magnetization is directed upwardly in the plane of the film, the film may be said to be in a 0 bistable state; when directed downwardly the bistable state may be referred to as a 1.

Serially coupling each of the films A–F is a first input line 10 which is connected to ground at one end and to a pulse signal source 12 at its other end. For the moment, consider source 10 as providing a single input pulse, such as that shown by waveform 14, for each stepping signal. The amplitude of this pulse is designated 2I. Upon application of such a pulse to line 10, each of films A–F is switched to its 0 state if not already therein. When one of the films changes from its 1 to 0 state, an output signal is induced in the respective output line 16. It will be noted that each film has such an output line. In addition, each film has a second input line which is designated 18 with the output line 16 for film F being coupled back to the input line 18 for film A to effect a "ring."

Between each output line 16 associated with one film and the input line 18 associated with the next film, there is a delay element which is preferably in the form of an amplifier having an inherent delay. These delay amplifiers are respectively designated 20, 22, 24, 26, 28 and 30. When cores A–F are actually thin films, each such amplifier may be comprised of a single stage transistor.

Figure 2:
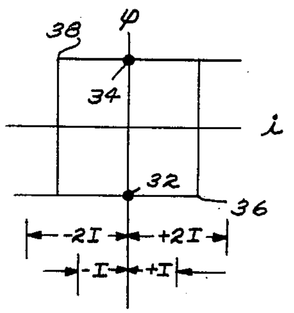
FIGURE 2 is a hysteresis loop illustration.

As is well known, a bistable ferromagnetic film has a rectangular loop hysteresis characteristic, for example as indicated in FIGURE 2 on flux versus current axes. When a film is at rest in its negative remanent state, the remanence may be said to be at point 32 on the loop, while point 34 indicates the positive remanence point. Arbitrarily, these respective points may be referred to as the 1 and 0 states of the film. When the film is in a 1 state at point 32, the application to the film along its easy axis of a field of strength 2H will cause the hysteresis loop to be traced counterclockwise toward positive saturation. Upon the relaxation of that field, the magnetization of the film will come to rest in its 0 state at point 34. In like manner, upon the application of a field of strength —2H, a film initially in its 0 state will be switched to its 1 state. However, when a film is initially in its 0 state, the application of a +2H field thereto will not cause the film to change its state, but instead it will again come to rest in its 0 state; similarly as to the 1 state when a field of —2H is applied. Further, if the field is insufficient to cause traversal of the hysteresis loop to knee 36 or 38 as the case may be, the film will not change state. Such a field is frequently referred to as a "half field," and is herein designated by the letter H. Currents applied to a line coupled to a film and causing therein a field strength of 2H are referred to as having an amplitude of 2I, while any current which causes a field amplitude of H is indicated as having an amplitude of I. These currents may be positive or negative as required by the sign of the corresponding field.

Operation of FIGURE 1 as a ring counter may be best considered with relation to Table I.

*Table I*

| Cores | A | B | C | D | E | F |
|---|---|---|---|---|---|---|
| Initial States | 1 | 0 | 0 | 0 | 0 | 0 |
| Common Input +2I | 0 | ---- | ---- | ---- | ---- | ---- |
| Delay Units: | | | | | | |
| 1 | ---- | —2I→1 | ---- | ---- | ---- | ---- |
| 2 | ---- | ---- | +2I 0 | ---- | ---- | ---- |
| Final States | 0 | 1 | 0 | 0 | 0 | 0 |

In the above table, it is assumed that all of the films A–F are initially in their 0 states except for film A. (No specific means is illustrated or described for initially placing any of the films in a particular state since means for accomplishing this is well known in the art.) When the first pulse amplitude 2I issues from source 12 onto line 10, film A is changed to its 0 state while the other films remain in their 0 states. The change of film A to its 0 state causes an output signal to be provided to delay amplifier 20. This amplifier in turn inverts the signal and increases its amplitude as necessary to 2I so as to provide a —2I input signal to film B via line 18. This input signal occurs, of course, after the delay time inherent in amplifier 20. In relation to Table I above, such delay is referred to as one unit, and exceeds in time the duration of pulse 14 so that the input on line 18 to film B begins after the ending of pulse 14 from source 12. Since film B was initially in its 0 state and was not changed therefrom by pulse 14, the input signal from amplifier 20 causes film B to switch to its 1 state. This in turn induces an output signal via line 16 to amplifier 22 which generates after another unit delay an input signal of amplitude +2I on line 18 for film C. Since the positive polarity input signal is ineffective to change any film from its 0 to 1 state, film C remains in its 0 state, and no input signal is applied to amplifier 24. The remaining films D, E and F likewise stay in their 0 state. In the final analysis then, the 1 stored in film A has been shifted to film B. A second input pulse on line 10 would effect movement of the stored 1 from film B to film C, etc., for successive pulses.

From the operation as above described, it may be considered that FIGURE 1 is a ring counter of the n-bit circulatory register type in which only one stage at a time is in the 1 state. However, by reference to Table II below, it will become apparent that more than one of the magnetic core stages may initially be in a 1 state and still be stepped along, i.e., circulated, from stage to stage in response to successive signals from source 10.

*Table II*

| Cores | A | B | C | D | E | F |
|---|---|---|---|---|---|---|
| Initial States | 1 | 0 | 1 | 0 | 0 | 0 |
| Common Input +2I | 0 | ---- | 0 | ---- | ---- | ---- |
| Delay Units: | | | | | | |
| 1 | ---- | −2I→1 | ---- | −2I→1 | ---- | ---- |
| 2 | ---- | ---- | +2I 0 | ---- | +2I 0 | ---- |
| Final States | 0 | 1 | 0 | 1 | 0 | 0 |

As will be apparent from Table II, the operation of film cores A, B and C is the same as indicated for Table I, and the operation of cores C, D and E is similar to the operation of cores A, B and C. In Table II the two film cores A and C which are in their respective 1 states are separated in the line of successive stages by film B which is initially in a 0 state. This is one criterion which is essential in order to cause the register to represent the same binary number shifted one position to the right, unless a different mode of operation than that above described is effected. That is, as may be seen from Table III below, even though adjacent stage film cores A and B are initially in their 1 states, the final stage of the register when operated as above described does not indicate two successive 1's, but the 1 finally stored in films B and D is separated by a 0 in core C.

*Table III*

| Cores | A | B | C | D | E | F |
|---|---|---|---|---|---|---|
| Initial States | 1 | 1 | 0 | 0 | 0 | 0 |
| Common Input +2I | 0 | 0 | ---- | ---- | ---- | ---- |
| Delay Units: | | | | | | |
| 1 | ---- | −2I→1 | −2I→1 | ---- | ---- | ---- |
| 2 | ---- | ---- | +2I→0 | +2I 0 | ---- | ---- |
| 3 | ---- | ---- | ---- | −2I→1 | ---- | ---- |
| 4 | ---- | ---- | ---- | ---- | +2I 0 | ---- |
| Final States | 0 | 1 | 0 | 1 | 0 | 0 |

To prevent operation such as exemplified in Table III whenever two successive stages contain a 1, the amplifiers may be constructed to amplify only negative polarity input signals, i.e., may be operated at or near cutoff as in a Class B mode. In this manner, the +2I signal shown generated during delay unit 2 for film core C in Table III, is not generated by amplifier 22. Consequently, core C remains in its 1 state; similarly for cores D and E.

Figure 3:
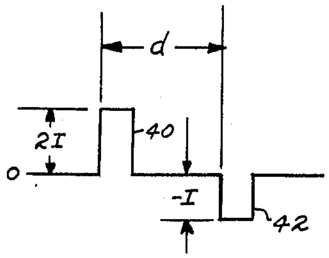
FIGURE 3 is a modified waveform of the stepping signal which may be utilized with FIGURE 1.

Another way of effecting this same sort of operation is to cause the pulse signal source 12 of FIGURE 1 to provide a bi-polar stepping signal such as that shown in FIGURE 3. Operation in this manner may be followed with the aid of Table IV.

*Table IV*

| Cores | A | B | C | D | E | F |
|---|---|---|---|---|---|---|
| Initial States | 1 | 1 | 1 | 0 | 0 | 0 |
| Common Input +2I | 0 | 0 | 0 | ---- | ---- | ---- |
| −I (1 unit delayed) | ---- | −I−I→1 | −I−I→1 | −I−I→1 | −I 0 | −I 0 |
| 2 delay units | ---- | ---- | +I 1 | +I 1 | +I 0 | ---- |
| Final States | 0 | 1 | 1 | 1 | 0 | 0 |

The first pulse 40 in FIGURE 3 is of positive amplitude 2I the same as pulse 14 shown in FIGURE 1, and effects the same change of state of all the films from 1 to 0 if not already in a 0 state. Each of the amplifiers is then changed to cause its output to have an amplitude of —I instead of —2I. Therefore, when amplifier 20 provides its output of —I to film B, pulse 42, also of amplitude —I as it issues from source 12, is provided to film B coincident therewith. These two negative pulses have a total effect of a —2I input signal. However, the output from amplifier 22 in response to an input signal caused by the changing of film B from a 0 to 1 state, is +I. This is insufficient to cause film C to change its state, and even if it were of negative polarity would be too late to be combined with the negative pulse 42 from source 12. That is, as indicated in Table IV above in conjunction with FIGURE 3, the common input —I pulse 42 occurs at the end of one unit of delay *d* which is at the same time as amplifier 20 or any of the other amplifiers would provide an output signal due to the film core preceding same changing from 1 to 0 in response to a +2I stepping signal. Since the amplifier output is at that time —I, it combines with the —I pulse 42 to effect a —2I input to the next core. This changes those cores receiving same from 0 to 1, which in turn causes from the respective succeeding amplifiers a second output at the end of a second delay time of amplitude +I. For example, the second output from the succeeding amplifier 22 begins at a time *d* later than pulse 42. Consequently, the +I input to the next core is, alone, ineffective to change its state. From the foregoing it will be apparent that the use of a bi-polar stepping pulse signal as in FIGURE 3 prevents any film core from changing from its 0 to 1 state by internal pulse generation after the second pulse in the input signal has occurred.

Operation of FIGURE 1 in the manner just described in relation to Table IV plus FIGURE 3 or the biasing of the amplifiers at or near cutoff as in Class B operation, makes the circuit suitable as a shift register or the like wherein adjacent bits may be binary 1's. The circuit may also be used wtih inputs and outputs via the respective amplifiers for any conventional purpose desired. If the output signal on any of the output lines 16 is sufficient when produced by a film changing its state to supply a reasonable fraction of the power required to drive the next film, the amplification properties of elements 20, 22, 24, 26, 28, 30 may be dispensed with while still keeping the delay factor thereof so as to prevent an output therefrom coincident at all with the 2I pulse from source 12.

Thus it is apparent that this invention successfully achieves the various objects and advantages herein set forth.

Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. A stepping circuit comprising a plurality of successive stages each of which includes a bistable magnetic element, means responsive to an applied pulse signal and commonly coupled to said elements for initially changing all the elements to the same first stable state if not already therein, and a plurality of means each having its own delay element and respectively coupled between each two successive stages for changing, after a delay time beginning when said signal is applied, the magnetic element in the second of those two stages to its second stable state in response to a change of the element in the first of those two stages to said first state if such change occurs when said signal is applied, each of the last mentioned means being effective to cause said delay time to exceed the time duration of any pulse signal which causes via the commonly coupled means a change of said elements to their respective first stable states, means for supplying said pulse signal as a first pulse with an amplitude sufficient to change all the elements to their said first states followed by a second pulse of polarity opposite said first pulse and of an amplitude substantially less than said first pulse with the time between corresponding points on the first and second pulses being substantially equal to said delay time.

2. A stepping circuit comprising a plurality of successive stages each of which includes a bistable ferromagnetic thin-film element having an easy axis of magnetization, means responsive to an applied pulse signal and commonly coupled to said films for initially applying a magnetic field along said easy axis to change all the films to the same first stable state if not already therein, and a plurality of means each having its own delay element and respectively coupled between each two successive stages for changing, after a delay time beginning when said signal is applied, the film in the second of those two stages to its second stable state in response to a change of the film in the first of those two stages to said first state if such change occurs when said signal is applied, each of the last mentioned means being effective to cause said given delay time to exceed the time duration of any pulse signal which causes via the commonly coupled means a change of said films to their respective first stable states.

3. A circuit as in claim 2 wherein, in consideration of any three successive ones of said stages, the circuit is operative to cause the films in the second and third of such three stages to change from their respective first to second states after a first of said delay times assuming the films in the first and second ones of those three stages were both previously changed by said signal from their second to first states with the said change of the second stage film from its first to second state being normally operative after a second of said delay times to cause the said third stage film to revert to its first state, and further including means for preventing the change of any such second stage film from its first to second stage, from being effective to revert said third stage film to its first state after said second delay time.

4. A circuit as in claim 2 and further including means for preventing any of said films from changing from its said second to first state in response to a change of the film in the next preceding stage from its first to second state.

5. A circuit as in claim 4 wherein each of the said last mentioned means includes an amplifier which inherently has said delay time and doubles as the respective delay element, each such amplifier being constructed to give a predetermined amount of amplification to its input signals only if any such input signal is of one polarity and not the other.

6. A stepping circuit comprising a plurality of bistable magnetic cores, an input line serially coupling each of said cores and responsive to an input pulse of given polarity and amplitude to cause each of the cores to change to a first stable state if not already therein, an output line for each core, a second input line for each core, a plurality of amplifiers each having an amount of inherent delay respectively coupling said output lines to a different one of said second input lines, said output and second input lines as coupled by a respective amplifier being oriented relative to their respective cores so that any signal induced in an output line by a change in its associated core from said second to first state causes a signal via the coupling amplifier to the next core which is of a polarity to switch the next core from its first to second state and which is substantially one-half the amplitude required to effect said change, and means for supplying at least one input signal to the first mentioned input line as said input pulse of a magnitude sufficient to switch said cores from said second to first state followed by a second input pulse of polarity tending to switch the cores from said first to second state and of amplitude of substantially one-half that required to effect said shift, with a time interval between said one and second input pulses being substantially equal to the time required for an amplifier to produce a signal to its associated input line in response to said first input pulse changing the associated input core from its second to its first state.

7. A stepping circuit as in claim 6 wherein each of said magnetic cores is a ferromagnetic film with a single easy axis, each input and output line coupled to each film being oriented substantially perpendicular with the easy axis thereof.

8. A circuit as in claim 7 wherein each of said amplifiers includes a single transistor.

References Cited in the file of this patent

UNITED STATES PATENTS

| | | |
|---|---|---|
| 2,622,213 | Harris | Dec. 16, 1952 |
| 2,872,663 | Kelner | Feb. 3, 1959 |
| 2,884,621 | Ross | Apr. 28, 1959 |
| 2,912,596 | Huang | Nov. 10, 1959 |

OTHER REFERENCES

Publication: IBM Technical Disclosure Bulletin, vol. 2, No. 1, June 1959, p. 30, copy in 340-174 SR.